United States Patent [19]
Stanley et al.

[11] Patent Number: 5,880,404
[45] Date of Patent: Mar. 9, 1999

[54] POWER TRANSMISSION SUPPORT STRUCTURES

[75] Inventors: Earl K. Stanley, Naples, Fla.; John R. Mott, Walkersville, Md.

[73] Assignee: Advanced Metals Technology Corporation, Walkersville, Md.

[21] Appl. No.: 883,123

[22] Filed: Jun. 26, 1997

Related U.S. Application Data

[60] Provisional application No. 60/020,753 Jun. 28, 1996.

[51] Int. Cl.$^6$ .................................................. H02G 7/20
[52] U.S. Cl. .......................................... 174/45 R; 52/736
[58] Field of Search ................. 174/45 R; 52/736.2; 138/141; 264/31; 428/34.5

[56] References Cited

U.S. PATENT DOCUMENTS

| | | | |
|---|---|---|---|
| 839,272 | 12/1906 | Crow | 52/697 |
| 1,378,188 | 5/1921 | Northrup | 373/153 |
| 2,066,419 | 1/1937 | Pfistershammer | 52/736.2 |
| 2,128,294 | 8/1938 | Gage | 52/296 |
| 2,702,103 | 2/1955 | Pfistershammer | 52/736.2 |
| 2,870,793 | 1/1959 | Bailey | 138/141 |
| 3,013,584 | 12/1961 | Reed et al. | 138/145 |
| 3,100,555 | 8/1963 | Ashton | 52/651.01 |
| 3,227,431 | 1/1966 | Steeves | 340/852 |
| 3,287,773 | 11/1966 | Woodburn, Jr. | 164/452 |
| 3,503,598 | 3/1970 | Babel et al. | 266/275 |
| 3,514,519 | 5/1970 | Schempp et al. | 373/110 |
| 3,689,051 | 9/1972 | Miller | 266/275 |
| 3,703,601 | 11/1972 | Babel | 373/163 |
| 3,708,600 | 1/1973 | Nickel et al. | 373/156 |
| 3,713,262 | 1/1973 | Jatcko | 52/98 |
| 3,916,047 | 10/1975 | Niesen | 428/34.1 |
| 4,269,887 | 5/1981 | Sonobe et al. | 442/320 |
| 4,312,162 | 1/1982 | Medney | 52/309.16 |
| 4,492,382 | 1/1985 | Hounsel | 277/654 |
| 4,550,412 | 10/1985 | Holcombe et al. | 373/155 |
| 4,583,230 | 4/1986 | Komada et al. | 373/156 |
| 4,618,964 | 10/1986 | Larsson et al. | 373/155 |
| 4,675,879 | 6/1987 | Meredith | 373/155 |
| 4,785,593 | 11/1988 | Munoz, Jr. | 52/126.1 |
| 4,803,819 | 2/1989 | Kelsey | 52/309.1 |
| 4,813,651 | 3/1989 | Rutledge | 256/65 |
| 4,921,222 | 5/1990 | Mott | 266/275 |
| 5,082,701 | 1/1992 | Craven et al. | 428/34.5 |
| 5,175,442 | 12/1992 | Ashley | 307/91 |
| 5,247,774 | 9/1993 | Johnson | 52/697 |

FOREIGN PATENT DOCUMENTS

| | | |
|---|---|---|
| 0077940 | 5/1982 | European Pat. Off. . |
| 0152849 | 2/1985 | European Pat. Off. . |
| 2809072 | 9/1978 | Germany . |
| 53-18427 | 8/1976 | Japan . |
| 346290 | 5/1965 | U.S.S.R. . |
| 357598 | 12/1970 | U.S.S.R. . |
| 1184838 | 1/1984 | U.S.S.R. . |
| 2106888 | 9/1982 | United Kingdom . |
| 2190371 | 5/1987 | United Kingdom . |

OTHER PUBLICATIONS

Calidus advertisement, ASEA Metallurgy.
Glass Fibre Reinforced Cement, K.L. Yu and L. & D.L. Biryukovich, pp. 1–41, Kiev, 1964.
Filament Winding Fibre Concrete, Niels Clauson–Kaas, pp. 121–125.
Vitrocem Consultancy Services Limited, Comparative Energy Contents of Some Common Construction Materials, Aug. 1989.
NPCA "Insight" Issue 1994.
New Cements–Inorganic Plastics of the Future, J.D. Birchall, A.J. Howard and K. Kendall.

*Primary Examiner*—Nestor Ramirez
*Assistant Examiner*—Joseph Waks
*Attorney, Agent, or Firm*—Dickinson Wright PLLC

[57] ABSTRACT

Supports for power transmission lines are made of inductively transparent, inorganic cement composite materials. Separate parts of the structure are provided with mating surfaces and are secured together by expanding grout. When the structure is in the form of a pole, the bottom of the pole can be attached to a base by sleeves secured to the pole.

11 Claims, 4 Drawing Sheets

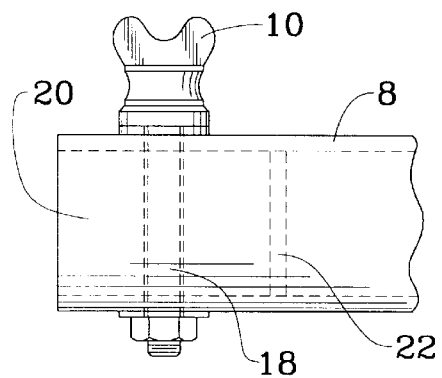
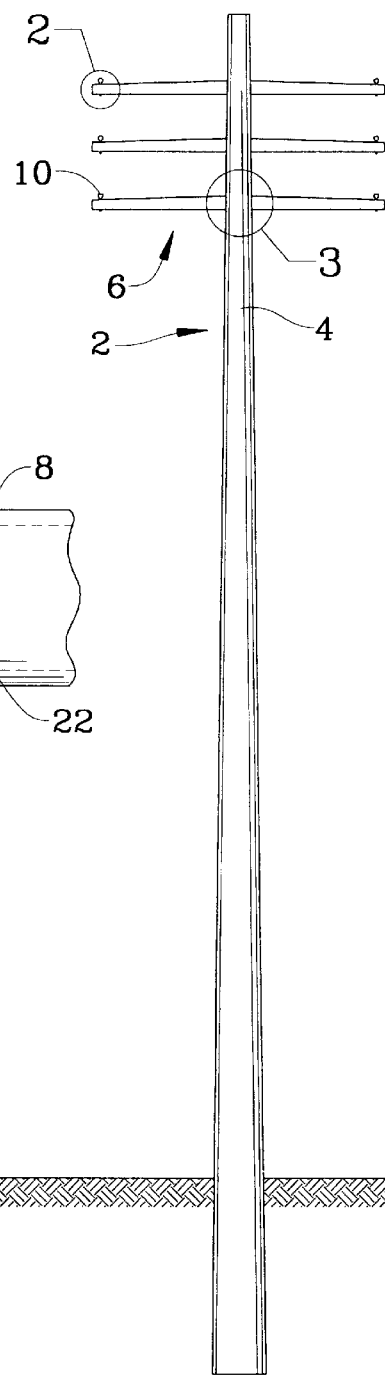
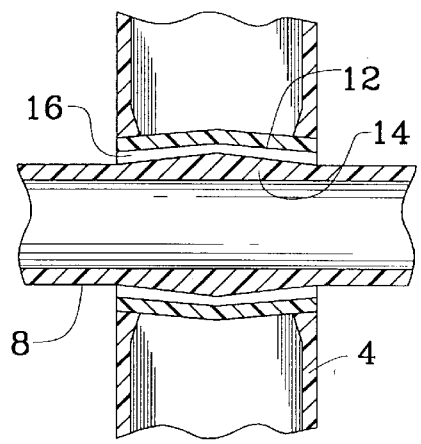

POWER TRANSMISSION SUPPORT STRUCTURES

CROSS REFERENCE TO RELATED APPLICATION

This application relates to provisional application Ser. No. 60/020,753, filed Jun. 28, 1996.

TECHNICAL FIELD

This invention relates to the art of structures for supporting high tension power transmission lines and high tension substation structures.

BACKGROUND ART

Known structures for supporting high tension power transmission lines present several problems. One problem arises because the structures are generally made of inductive material, the induction caused by the high voltages in the transmission lines decreasing the power carrying capacity of the system. Some support structures are made of wood, but these structures are usually small and expensive to maintain. Larger poles are typically made of steel, and these are conductive and present the problem of induction and the risk of a short to ground. Similar problems exist throughout the high tension infrastructure, for example, in the structures used in substations.

The typical solution to these problems is to space the high tension lines from the support structure by significant distances with large insulators. These insulators, however, are expensive and require the structures themselves to be large as well.

Another solution that has been proposed is to make the support structure of plastic materials that are not inductive. These structures have not been successful because such structures having adequate strength are quite expensive. Further, plastic towers are flexible, which makes them vulnerable to excessive vibration in windy conditions. These vibrations are transmitted to the power lines causing them to break and resulting in often serious damage. Another drawback to the use of plastics is that they degrade significantly in the harsh environment to which the structures are exposed, particularly UV-radiation from the sun.

It has also been proposed to make utility poles of steel-reinforced concrete. These poles are also very susceptible to the weather, particularly moisture, which causes the steel to rust and degrade the concrete by spalling.

SUMMARY OF THE INVENTION

In accordance with the invention, the high tension support poles are made of a composite material having physical and chemical properties that make it ideal for this purpose. The material is a composite made of an inorganic cement and inductively transparent glass fibers. This material is preferably that disclosed in U.S. Pat. No. 4,921,222 (Moft).

The composite material utilized for the structures of the invention has a high strength-to-weight ratio and high torsional rigidity. It is also non-corroding in a variety of environmental conditions, and the exterior of this material may easily be sealed whereby there is no significant absorption of water. These properties allow the material to be used in harsh weather over extended periods of time. Electrically, the material is transparent to electromagnetic fields of the frequencies employed in high tension transmission and has high dielectric strength.

Because the high tension power poles and other such structures made of the preferred composite material are inductively transparent, fewer expensive insulators are required to support a power line on the structure, and the poles may be smaller. Moreover, because of the physical properties of the material, the poles will have a very long life, which further reduces costs.

The support structures in accordance with the invention are preferably manufactured in the form of poles by winding fiberglass under tension around a mandrel while supplying the inorganic cement, to form a fiberglass winding in an inorganic-cement matrix. Poles such as this may be made in a variety of shapes and sizes, depending on the number of transmission lines to be supported and the terrain. In one embodiment, a support pole is a single, elongated element tapered from the bottom to the top having one or more cross pieces with insulators for engaging the transmission lines. The support structures may, however, be of other shapes, such as that of a tower having trusses constructed from individual pieces made of the inorganic cement composite material.

When the support structure is in the shape of a pole, it may be attached to the ground in any of several ways. In one embodiment, for example, the bottom portion of the pole may simply planted in the ground. Preferably, the pole is provided with a bottom flange for engaging a base structure, such as a concrete base that has been installed previously. The flange is attached to the pole is any of several ways.

The cross pieces may be attached to the pole by any of several techniques. In one embodiment, a tapered receptacle is formed in the composite material during manufacture and a cross piece made of the same composite material is held in the receptacle by grout, which is preferably expanding grout for ensuring a secure connection.

An object of this invention is to provide an inductively transparent structure for supporting high tension transmission lines.

Another object of this invention is to provide a support structure for high tension transmission lines that is inexpensive and yet highly resistant to environmental conditions.

Yet another object of this invention is to provide a support structure for high tension transmission lines that has superior physical strength.

BRIEF DESCRIPTION OF THE DRAWINGS

FIG. 1 is a side view of a transmission line support structure in accordance with the invention.

FIG. 2 is a partial cross section of the top of the structure shown in FIG. 1.

FIG. 3 is a partial, enlarged view of the support structure shown in FIG. 1.

DETAILED DESCRIPTION OF THE INVENTION

Figure 4:
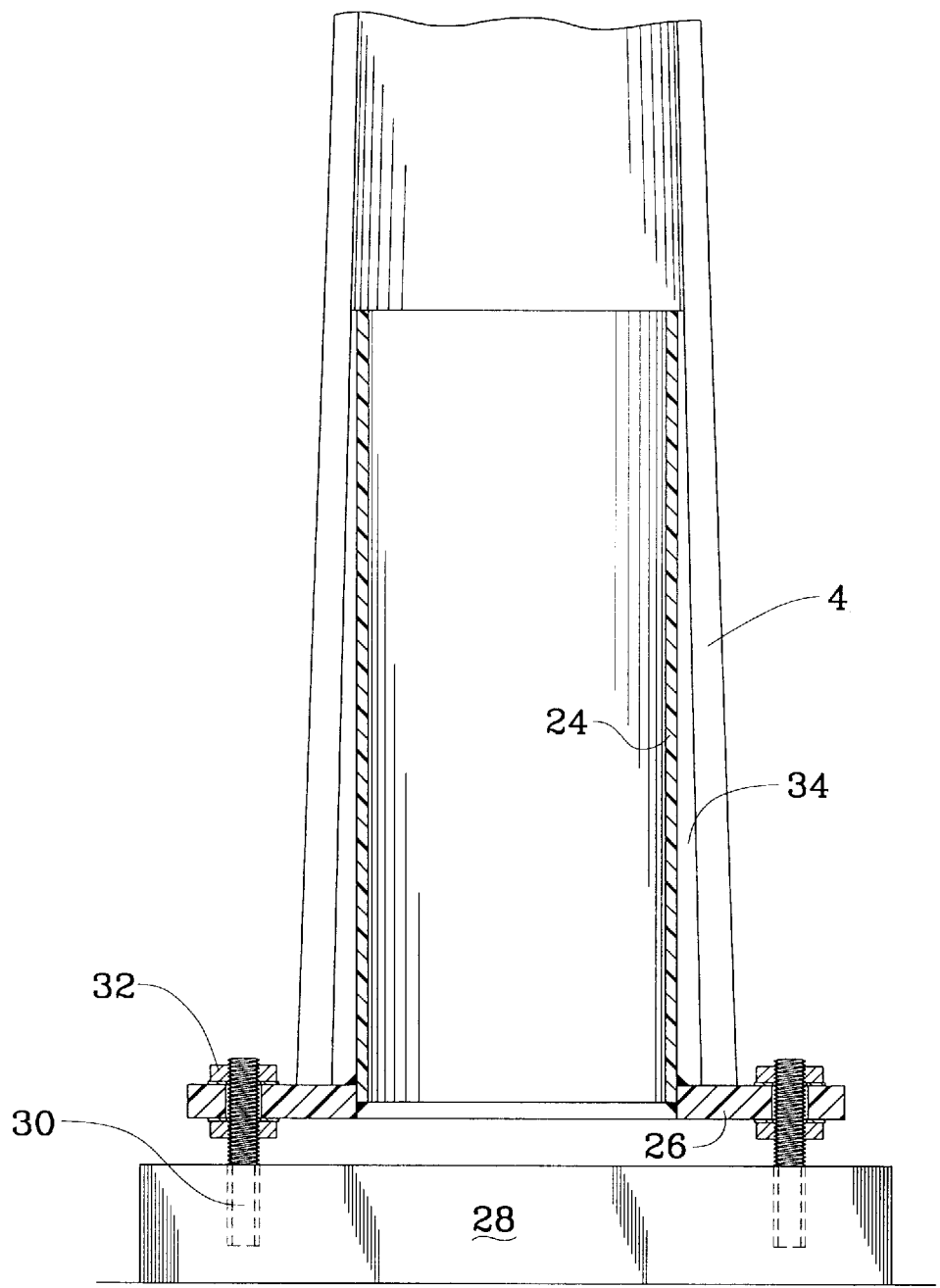
FIG. 4 is a cross section of the lower end of a second embodiment of the support structure shown in FIG. 1.

FIG. 1 illustrates an embodiment of the invention wherein an apparatus 2 for supporting high-tension power lines comprises a support structure 4 and line securing elements 6 made of inductively transparent, substantially continuous glass fibers and inorganic cements, such as those described in the aforementioned Moft patent. The support structure shown in FIG. 1 is in the shape of a tapered pole and is supported in the ground by placing a lower end of the pole in a hole in the ground.

The pole illustrated in FIG. 1 may be made by winding glass fibers under tension about a tapered mandrel while supplying the inorganic cement. The mandrel is then withdrawn after the composite material has cured and the line-securing elements are added.

FIGS. 2 and 3 illustrate one method for attaching the line-securing elements to the support structure. In this embodiment, the line securing element 6 comprises a cross beam 8 that supports an insulator 10, the transmission line itself (not illustrated) being attached to the insulator 10.

FIG. 3 illustrates the connection between the cross beam 8 and the support structure 4. A receptacle 12 in the shape of two truncated cones placed back-to-back is first made from the inductively transparent inorganic cement composite material. For example, the glass may be wound on a cardboard mandrel of the desired shape or a collapsible mandrel of that shape. The receptacle is then made a part of the support structure by winding it into the composite material during manufacture of the support structure. The crossbeam 8 is wound with known techniques except that a central section 14 is enlarged to provide an exterior shape similar to the interior of the receptacle. The maximum outside diameter of the cross beam 8 is just less than the smallest inside diameter of the receptacle to allow the cross beam to be inserted into the receptacle. The cross beam is secured to the receptacle by filling the gap 16 with grout, which preferably expands as it cures, to hold the cross beam securely to the support structure 4. Other means may be used to secure the cross beam to the support structure, such as by providing threaded holes for bolting the two parts together. As well, other prior art structures may be used in combination with the components made of inductively transparent composites. For example, a wood crossbeam, and metal parts, such as bolts or brackets that are small and induct only insignificantly may be employed.

FIG. 2 illustrates one technique for holding a insulator 10 to the cross beam 8. The insulator includes a shaft 18 that has the insulator at one end and is threaded at the other for receiving a nut. The shaft passes through holes that have been drilled in the cross beam 8. The end of the cross beam may also be filled with grout or cement 20 by placing a plug of foam 22 in the end of the beam and pouring the grout in the end. This will seal the end of the beam and allow the nut to be tightened without damaging the beam.

Figure 5:
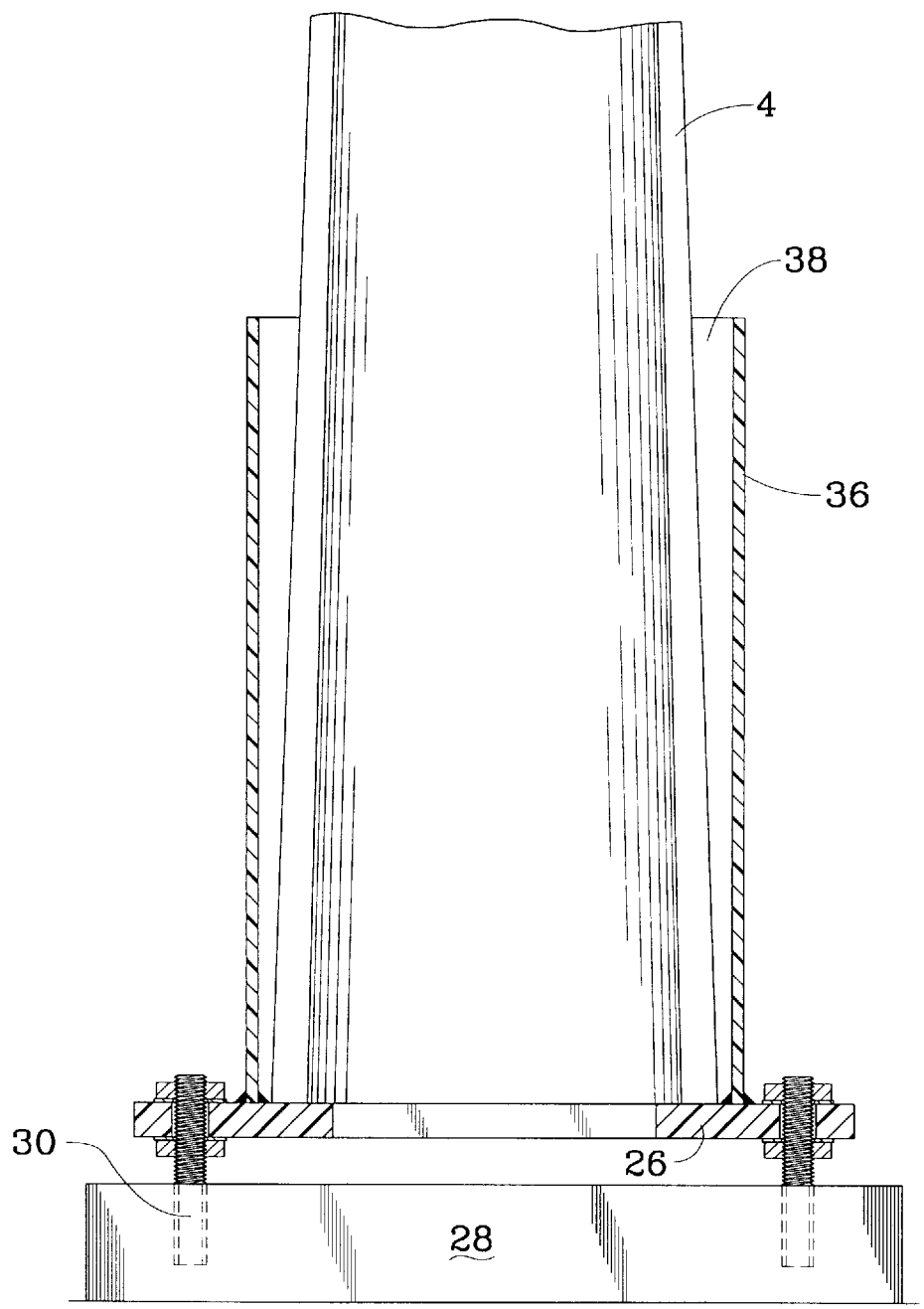
FIG. 5 is a cross section of the lower end of a third embodiment of the support structure shown in FIG. 1.
Figure 6:
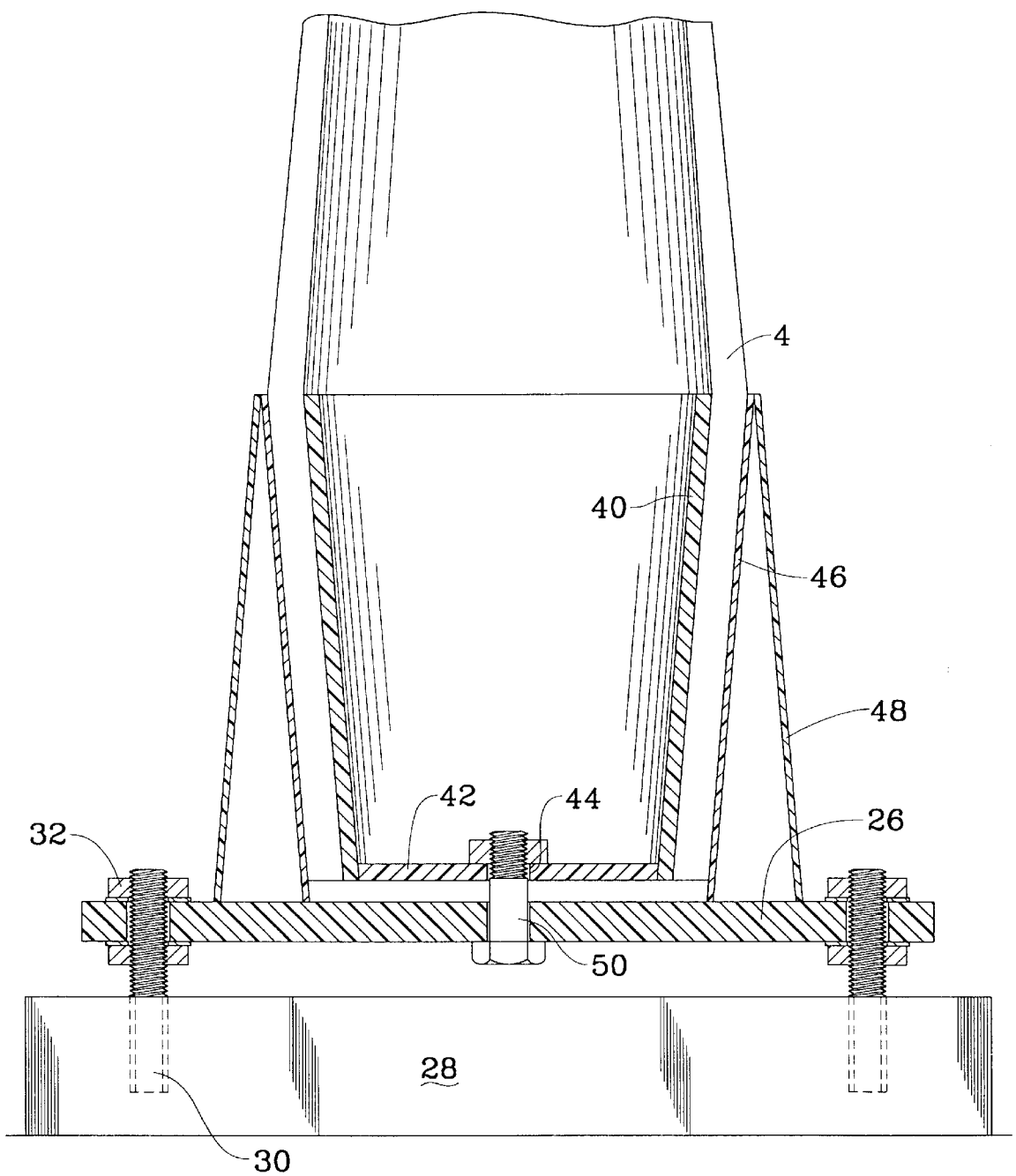
FIG. 6 is a cross section of the lower end of a fourth embodiment of the support structure show in FIG. 1.

FIGS. 4 through 6 illustrate several techniques for attaching the support structure to the ground. The embodiments of these figures attach the support structure to a base that has previously been secured to the ground, whereas the embodiment shown in FIG. 1 simply places the bottom of the pole in a hole in the ground. In the embodiment in FIG. 1, it may be desired to fill the bottom portion of the pole with cement or the like to provide added weight to the pole and to cap the end of the pole against entry of moisture, etc. As well the top of the pole should be capped. Further, because a pole made of the disclosed composite materials may have characteristics different from those of normally used poles, it may be desirable to add weight to other parts of the pole to adjust these characteristics.

FIG. 4 illustrates an embodiment where a cylindrical sleeve 24 having a flange 26 attached thereto, as by welding, is placed in the lower end of the support structure. As noted above, the preferred method of constructing the support structure is by winding on a mandrel, and this results in the support structure's being hollow. Thus, the cylindrical sleeve can be placed inside the support structure such that the flange can be attached to a base 28 having threaded studs 30 by nuts 32. A gap 34 between the sleeve and the inside of the pole is filed with grout to hold the pole to the sleeve. The sleeve shown to be a right cylinder, but it may be tapered or otherwise configured to provide desired flexure characteristics, for example, to match those of the pole and prevent development of stress points.

FIG. 5 shows an embodiment wherein a sleeve 36 is secured to the exterior of the pole 4. This sleeve is attached to a flange 26, which is bolted to the base 28 as shown in FIG. 4. The gap 38 is filled with grout.

FIG. 6 illustrates yet another embodiment wherein the lower end of the pole is tapered such that it narrows toward the end and is provided with a conical sleeve 40. The sleeve 40 is used as a mandrel during winding and the pole is provided with an increased number of circumferential windings to provide increased hoop strength in this area. Also, the sleeve 40 may be provided with a rough exterior to provide increased gripping with the interior of the pole. The sleeve 40 is provided with a bottom plate 42 having a central hole and a nut 44 aligned with the hole and welded to the plate. The bottom portion of the pole is received in an outer sleeve 46, which is secured to a flange 26 and supported by a conical shoulder 48, which is secured to the outer sleeve at its upper edge and also to the flange 26. The plate 42 is held in the outer sleeve by a bolt 50, which pulls the conical bottom part of the pole into the conical sleeve 46 to secure the pole to the flange. It will be appreciated that this is a quite secure arrangement because tension forces on the pole are resisted by the strength of the inwardly tapered bottom part of the pole. Because this part is provided with extra hoops, it is very strong and, thus, is capable of resisting such forces.

It will be appreciated that a unique support structure for supporting high tension lines has been described. Because the structure is not inductive, the losses in the lines will be greatly reduced, and the spacing between the lines can be smaller. As well, the poles are stiffer than other non-inductive structures and are more resistant to environmental conditions. Modifications within the scope of the appended claims will be apparent to those of skill in the art.

We claim:

1. Apparatus supporting a high tension transmission line comprising a support structure having a structural wall providing structural strength for supporting said transmission line, the structural wall being of inductively transparent, substantially continuous fibers and an inductively transparent inorganic cement cementing said fibers together, said fibers and said cement imparting to the structural wall said structural strength for supporting said transmission line and being transparent to electromagnetic fields generated by said transmission line, and means for securing said transmission line to said support structure.

2. Apparatus according to claim 1 wherein said support structure is adapted to extend vertically and said means for securing is an elongate element extending transverse to said support structure and made of said inductively transparent, substantially continuous fibers and said inductively transparent inorganic cement.

3. Apparatus according to claim 2 wherein said means for securing further comprises an insulator attached to said elongate element for engaging said transmission line.

4. Apparatus according to claim 3 wherein said support structure is an elongate, tapered pole.

5. Apparatus according to claim 2 wherein said support structure includes a receptacle for attaching said means for securing to said support structure.

6. Apparatus according to claim 5 wherein said receptacle comprises a tapered sleeve extending across said support structure for receiving said means for securing therein.

7. Apparatus according to claim 1 further comprising means for attaching said support structure to a base.

8. Apparatus according to claim 7 wherein said support structure comprises a hollow portion at one end and said means for attaching comprises means for engaging an interior surface of said hollow portion and a flange for engaging said base.

9. Apparatus according to claim 8 wherein said means for engaging comprises a cylindrical tube that extends vertically and is secured to said flange, wherein said flange extends horizontally.

10. Apparatus according to claim 8 wherein said hollow portion is a truncated cone tapering in a direction toward said one end and said means for engaging comprises a vertically extending element in the shape of said truncated cone.

11. Apparatus according to claim 7 wherein said means for attaching comprises means for engaging an exterior surface of one end of said support structure and a flange for engaging said base.

* * * * *

UNITED STATES PATENT AND TRADEMARK OFFICE
CERTIFICATE OF CORRECTION

PATENT NO. : 5,880,404
DATED : March 9, 1999
INVENTOR(S) : Stanley and Mott

It is certified that error appears in the above-identified patent and that said Letters Patent is hereby corrected as shown below:

At column 4, line 47, after "structure", please add --supporting said transmission line--.
At column 4, line 47, after "providing", please add -- a --.

Signed and Sealed this

Twenty-eighth Day of December, 1999

Attest:

Q. TODD DICKINSON

Attesting Officer

Acting Commissioner of Patents and Trademarks